Nov. 8, 1949 R. J. KIRCHER 2,487,759
BLIND NAVIGATIONAL METHOD AND SYSTEM
Filed Feb. 16, 1944 3 Sheets-Sheet 1
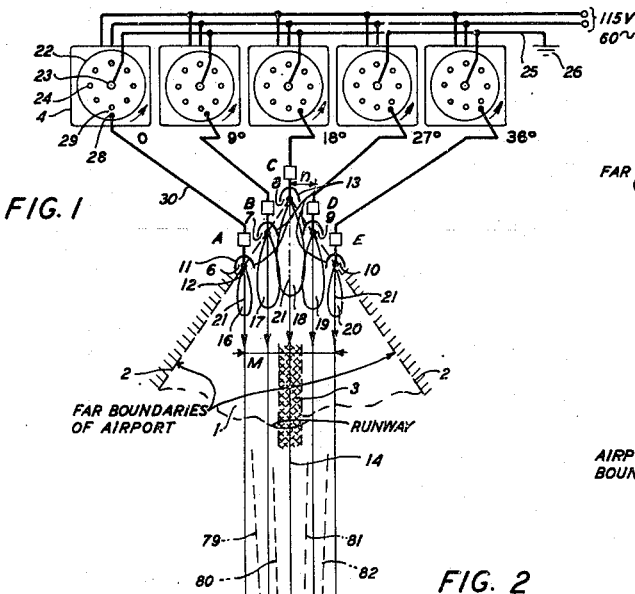
FIG. 1
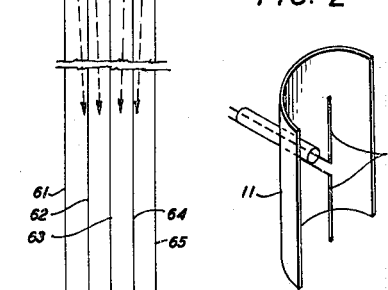
FIG. 2
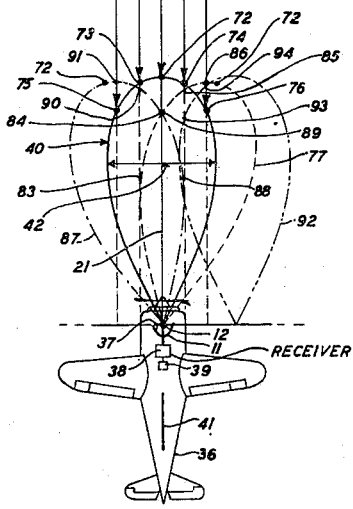
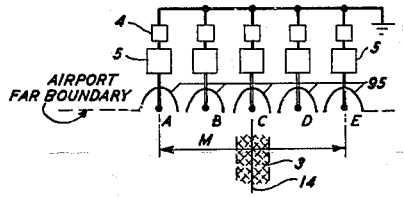
FIG. 10
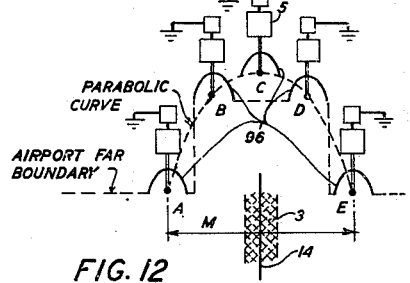
FIG. 11
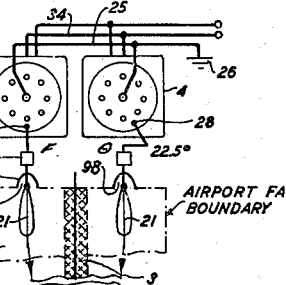
FIG. 12
INVENTOR
R. J. KIRCHER
BY *a. J. Zerbarini*
ATTORNEY Nov. 8, 1949 R. J. KIRCHER 2,487,759
BLIND NAVIGATIONAL METHOD AND SYSTEM
Filed Feb. 16, 1944 3 Sheets-Sheet 2
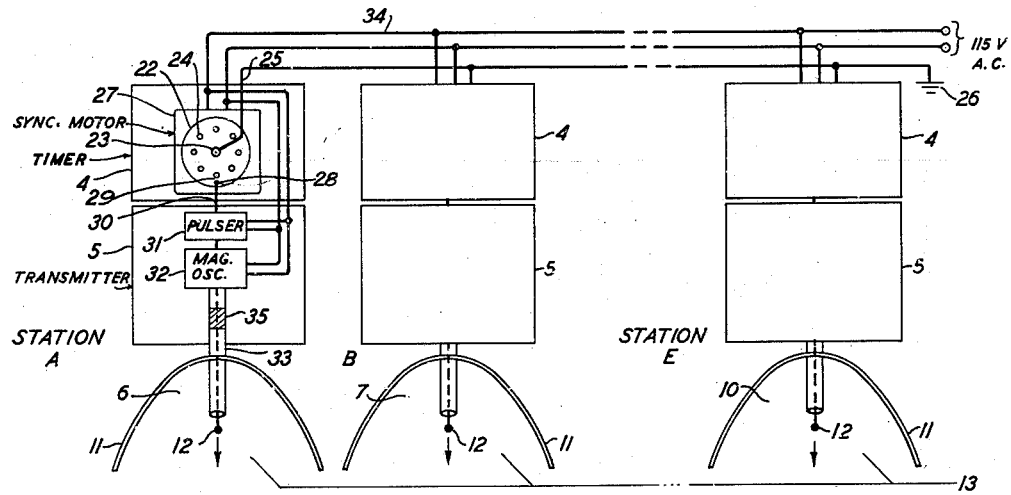
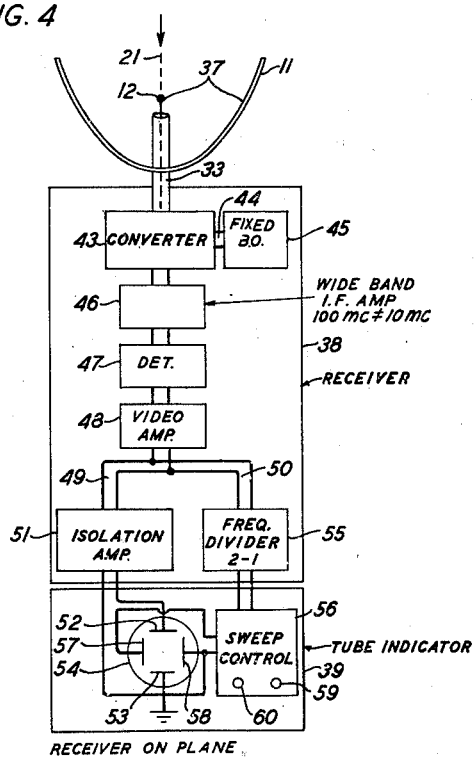
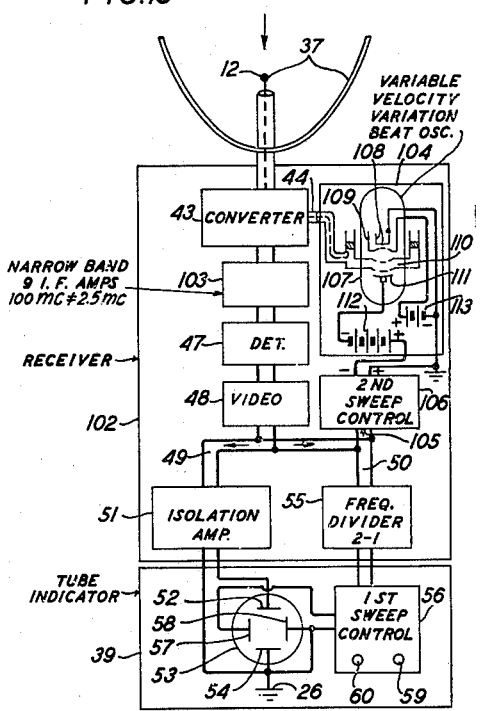
INVENTOR
R. J. KIRCHER
BY A. J. Zerbarini
ATTORNEY Nov. 8, 1949     R. J. KIRCHER     2,487,759
BLIND NAVIGATIONAL METHOD AND SYSTEM
Filed Feb. 16, 1944     3 Sheets-Sheet 3

THEORETICAL ON COURSE INDICATION

VISIBLE ON COURSE INDICATION

OFF COURSE (RIGHT) INDICATION

OFF COURSE (LEFT) INDICATION

DRIFT INDICATION

BEAT OSCILLATOR FREQUENCY-
REPELLER VOLTAGE VARIATION

INVENTOR
R. J. KIRCHER
BY A. J. Zerbarini
ATTORNEY

Patented Nov. 8, 1949

2,487,759

UNITED STATES PATENT OFFICE 2,487,759

BLIND NAVIGATIONAL METHOD AND SYSTEM

Reymond J. Kircher, Neptune, N. J., assignor to Bell Telephone Laboratories, Incorporated, New York, N. Y., a corporation of New York Application February 16, 1944, Serial No. 522,567

5 Claims. (Cl. 343—107)

This invention relates to direction finding and range determining methods and systems, and more particularly to blind navigational systems for ascertaining the bearing of a predetermined course.

Various systems, such as those disclosed in Patents 1,885,023 to M. Dieckmann, 2,151,549 to H. I. Becker, 2,204,628 to E. M. Sorensen, and British Patent 408,015, have been suggested for assisting an aircraft or marine pilot in effecting a blind landing under conditions of poor visibility. In general, the arrangements heretofore proposed are relatively complicated and more or less inaccurate, and it now appears desirable to obtain a simple, inexpensive blind navigational system for enabling a pilot accurately to ascertain the azimuthal orientation of an airport runway or a harbor channel. Also, in the arrangements of the prior art, waves which are not propagated solely along an optical path as, for example, short waves, are ordinarily utilized and, as a result, interference often occurs between wave components traversing the direct path and the indirect or reflected path via the earth's surface, whereby the direction or bearing indication obtained at the mobile craft is impaired or destroyed. It accordingly appears desirable to obtain, in a blind navigational system, indications which are not affected by ground reflection or other so-called ground effects.

It is one object of this invention to determine accurately, at a mobile craft, the bearing of a given course such as an airport runway or a harbon channel.

It is another object of this invention to ascertain at a mobile craft, the sense and amount of the deviation, if any, of the craft heading relative to a desired course.

It is another object of this invention to obtain at a mobile craft, in a radio blind navigational system, a visual representation or pictorial view of an airport or harbor.

It is another object of this invention to secure at a mobile craft approaching a runway or channel a visual indication of the range or distance between the moving craft and its destination.

It is still another object of this invention to establish, in a blind approach system, one or more marker fields which are not distorted or impaired by the so-called ground effects.

It is a further object of this invention to vary the frequency of a velocity-variation oscillator in accordance with the frequency variation in a wave, or a set of distinct waves, generated independently of the oscillator.

In accordance with one embodiment of this invention, a blind navigational system comprises a main microwave pulse transmitter positioned adjacent the far-end or terminal of an airport incoming runway, and an even plurality of auxiliary pulse transmitters positioned on each side of the runway and spaced at different distances from the runway. Each transmitter includes a unidirective parabolic antenna having in the azimuthal plane a primary lobe pointed toward the front boundary of the airport. The lobe axes are parallel with the runway and the lobe azimuthal plane patterns have similar shapes. Preferably, the transmitting antennas are spaced along a parabola so as to outline the airport, the axis of the parabola being coincident with the runway and the aperture diameter of the parabola, that is, the spacing between the extreme transmitters, being relatively small. The microwave frequencies radiated by the transmitters are substantially the same or as least included in a fairly narrow band. Means for provided for energizing the transmitters in success, left to right, and hence cyclically actuating each transmitter, so as to secure for each transmitter a high pulse rate or frequency of, say 480 pulses per second. In addition, means are provided for grading the intensities of the antenna energies in accordance with the so-called triangular taper or distribution, whereby the half-power or full-power intensities of the lobes decrease sharply from the center towards both ends of the array.

The microwave receiver at the mobile craft approaching the runway comprises a parabolic antenna having a sharp azimuthal plane lobe pattern, a velocity-variation oscillator for producing a constant beat frequency, a broad band intermediate frequency amplifier, a detector, a cathode-ray tube indicator and a sweep control circuit. The axis of the receiving antenna lobe is aligned with the longitudinal axis of the craft. The detected pulses are applied to the horizontal plates of the indicator and the horizontal sweep circuit is triggered by a sweep control voltage obtained from the received pulses and preferably having a frequency equal to one-half the pulse frequency of each transmitter and therefore directly related to the cyclic energization of the transmitters.

Assuming the craft is "on course" and that the craft heading is correct, the indicator pattern obtained is composed of individual vertical traces or pulses representing the transmitters. Each trace has a height related to the lobe intensity of the corresponding transmitting antenna and a position, relative to a central vertical reference line on the indicator, corresponding to the position of the respective transmitting antenna relative to the runway. With the craft heading off-course, the pattern is distorted, the skew in the pattern being of one sense when the heading is to the left and of the opposite sense when it is to the right. If the craft drifts considerably, the heading being parallel to the runway, only the left or right portion of the pattern is obtained, dependent upon the sense of the drift. When the craft is at a relatively large distance or range from the airport, and is properly headed, all emitted waves are received and all transmitters are represented in the pattern but, as the range decreases sufficiently, the waves from the extreme left and right transmitters are not received and the corresponding pulse indications disappear, until finally only the central pulse indication remains. Hence, the pilot may at any instant estimate his depth or progress into the transmitter fields, and the distance remaining to be traversed.

In a simplified and less expensive, but also less efficient and less satisfactory, embodiment only two auxiliary directive transmitters, one on each side of the runway, are successively actuated and an antenna having a cardioid directive characteristic is used on the mobile craft.

In a slightly different embodiment, instead of utilizing substantially identical or closely transmitting frequencies, the successively transmitted frequencies are graded or tapered upwardly or downwardly, left to right. At the receiver the beat frequency is simultaneously and correspondingly varied so as to secure an intermediate frequency of substantially constant frequency. As a result, instead of a broad band intermediate frequency amplifier, a narrow band amplifier may be satisfactorily used. More particularly, at the receiver an additional sweep circuit voltage is obtained and controlled by a detected voltage having a frequency equal to the transmitter pulse frequency; and this direct current sweep voltage is employed to vary the negative repeller voltage of the velocity-variation oscillator, whereby the beat frequency is cyclically varied directly in accordance with the cyclic change in the frequency radiated by the transmitting array.

The invention will be more fully understood from a perusal of the following specification taken in conjunction with the drawing on which like reference characters denote elements of similar function and on which:

Fig. 1 illustrates diagrammatically the arrangements, at an airport and at the mobile craft, of the apparatus used in the blind navigational method or system of the invention;

Fig. 2 illustrates in detail the antenna used with each of the transmitters of Figs. 1 and 3;

Fig. 3 is a block diagram illustrating in detail the transmitting apparatus used in the system of Fig. 1;

Fig. 4 is a block diagram illustrating in detail the receiving apparatus used at the mobile craft in the system of Fig. 1;

Figure 14:
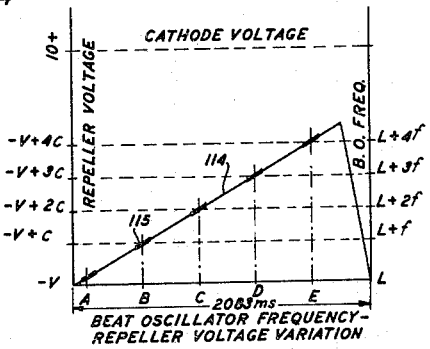

Figs. 10 and 11 each illustrate a transmitter layout or array which may be used in the system of Fig. 1, in place of the transmitter array shown in Fig. 1;

Fig. 12 illustrates diagrammatically a simplified blind navigational method or system in accordance with the invention;

Fig. 13 is a block diagram illustrating a receiver which is used in place of that illustrated by Fig. 4 when graded, instead of equal, frequencies are used at the transmitters of Fig. 2, and Fig. 14 is a curve used in explaining the operation of the receiver illustrated by Fig. 13.

Referring to Figs. 1, 2 and 3, reference numeral 1 denotes an airport having the far boundaries 2 and the runway 3. The reference characters A, B, C, D and E designate microwave transmitting stations each comprising a timer 4, a transmitter 5 and a highly unidirective antenna, the antennas at transmitters A, B, C, D and E being denoted by numerals 6, 7, 8, 9 and 10, respectively. As explained more fully hereinafter, the central station C is the main station and stations A, B, D and E are auxiliary stations. Each antenna comprises a cylindrical parabolic reflector 11 and a dipole 12, the focal line of the reflector being vertical and the dipole being aligned with the focal line. The antennas are spaced uniformly along the adjacent of the two boundaries 2 so as to form a corner array 13, Fig. 1, the central or main antenna 8 being at the vertex of the corner and on the center line 14, or an extension thereof, of the runway 3. The distance or span M between the extreme antennas 6 and 10 is in the order of a half mile and the antenna spacing N, measured along a line perpendicular to the runway 3, is in the order of an eighth of a mile. Numerals 16, 17, 18, 19 and 20 denote the traces or patterns, taken in the azimuthal plane, of the primary lobes for antennas 6, 7, 8, 9 and 10, respectively. The principal axis 21 of lobe 18 of the main antenna 8 is centered on, and the axes 21 of lobes 16, 17, 19 and 20 are parallel to, the runway center line 14. The axis 21 of each lobe is coincident with the axis of the associated parabolic reflector.

Referring particularly to Fig. 3, the timer 4 at each station comprises a metallic disc 22 mounted on and directly connected to a metallic shaft 23. The disc 22 has eight electrodes 24 spaced 45 degrees apart on the circumference of a circle. The shaft 23 is connected by conductor 25 to the ground 26 and is driven by the synchronous motor 27. Numeral 28 denotes a fixed electrode which is positioned adjacent the disc 22 and forms a transitory spark gap 29 successively with each of the eight electrodes 24 as disc 22 rotates. Electrode 28 is connected by conductor 30 to the pulser 31 and magnetron oscillator 32 in transmitter 5, the output of which is connected by coaxial line 33 to the dipole 12. The "design" or nominal output frequency of each magnetron is, for example, about 3000 megacycles corresponding to a wavelength of 10 centimeters. In practice, as is known, the actual or operating magnetron frequencies often deviate from the design value. The apparatus used, and the circuit adjustments at the transmitters, should be such that the variation in frequency is preferably not greater than plus and minus five megacycles.

Considering the several transmitters, power is supplied from a 115 volt, 60 cycle source to the motor 27, pulser 31 and oscillator 32 at each transmitter over line 34 and, since all of the motors 27 are connected to the same line 34, the discs 22 at the several transmitters rotate at the same speed. As shown more clearly in Fig. 1, the fixed electrodes 28 in the several transmitters are each displaced nine degrees relative to the electrodes in each of the two adjacent transmitters. Thus, in the 45 degree sector between any two adjacent moving electrodes 24, the fixed electrodes 28 occupy positions corresponding to 0, 9, 18 and 36 degrees. Hence, as the several discs move simultaneously through an angle of 45 degrees, one of the moving electrodes 24 sweeps or moves by the five fixed electrodes 28 in succession and the transmitters are successively actuated. The output coaxial lines 33 of the transmitters, except the line 33 associated with the main transmitter C, each include an attenuating or loaded section 35, the sections 35 being selected or adjusted to secure a triangularly graded output intensity distribution. To illustrate the output intensity of each of transmitters B and D may be six decibels, and the output intensity of each of transmitters A and E eleven decibels, below that of the reference transmitter C.

The apparatus at the mobile craft 36, Figs. 1 and 4, includes an unidirective antenna 37 comprising a cylindrical parabolic reflector 11 and a vertical dipole 12, a receiver 38 and a cathode tube indicator 39 of the type illustrated on pages 278 and 279 of the textbook "Practical Radio Communication," second edition, by Nilson and Hornung. The axis of the receiving parabola 11 and the axis 21 of its primary lobe 40 are aligned with the longitudinal axis 41 of the craft 36. The width 42 of the primary lobe 40 of the receiving antenna 37 is such that, with the craft on the course, waves are received from each of the transmitters A, B, C, D and E. More particularly, the receiving antenna is designed to have a primary lobe such that, at a distance of ten miles from the airport, the waves from all transmitters intersect the lobe at points differing less than 1 decibel in intensity. The receiving lobe may actually be very narrow. Thus, the end stations A and E are spaced one-half mile apart and if the left and right points on the lobe one decibel down from the lobe peak have an angular separation of three degrees, satisfactory reception of waves from all stations is secured. While, for purpose of explanation, a receiving lobe 40 of large size is illustrated on the drawing, it should be noted that the difference in the illustrated sizes of the receiving lobe 40 and any of the transmitting lobes is not of particular significance.

Referring to Fig. 4, numeral 43 denotes a converter or mixer, the input of which is connected by coaxial line 33 to the dipole 12 and by line 44 to a velocity-variation beat oscillator 45 which generates a substantially constant microwave frequency. The converter is connected to an intermediate frequency amplifier 46 designed to pass 30 or 60 or 100 megacycles plus and minus 5 to 10 megacycles, the band width of the amplifier being large enough to accept all normal frequency variations in the waves incoming from the several transmitters. The output of amplifier 46 is connected through the pulse detector-rectifier 47 to the video amplifier 48 having a divided output comprising branches 49 and 50. One branch 49 of the divided output is connected through the isolation amplifier 51 to the horizontal plates 52, 53 of the cathode-ray tube 54; and the other branch 50 is connected through a 2-to-1 frequency divider 55 and sweep control circuit or device 56 to the vertical plates 57, 58 of tube 54. Preferably, a five inch cathode-ray tube having a four inch linear horizontal sweep is employed. The tube 54 and the sweep control device 56 are included in indicator 39. Numerals 59 and 60 denote, respectively, an internal frequency control knob and a phase control knob for the sweep circuit 56. The receiver includes an automatic gain control circuit (not shown).

In operation, as appears from Figs. 1, 2, 3 and 4, as a rotating electrode 24 on disc 22 assumes, at each transmitter, a position opposite the fixed electrode 28, and forms therewith a spark gap 29, the discharge circuit for the condenser included in the magnetron oscillator is completed through the gap 29 to ground 26 and a pulse is radiated by the transmitting antenna. As transmitters A, B, C, D and E are actuated in succession, maximum radiant action occurs along the axes 21 of lobes 16, 17, 18, 19 and 20 respectively, and along the directions 61, 62, 63, 64 and 65 parallel to the runway centerline 14. For each revolution of disc 22 eight pulses are emitted and, with a disc rotation speed of 60 revolutions per second, each transmitter emits 480 pulses per second. Since the fixed electrodes are staggered or displaced nine degrees, in the interval between consecutive pulses from each transmitter the remaining four transmitters successively emit four pulses, so that the five transmitters radiate 2400 pulses per second. The successive actuation of the five transmitters is cyclically repeated at a rate, hereinafter called the "transmitting sweep frequency," of 480 times per second. Assuming for the moment, that the spark gap discharge is instantaneous or has a duration of 1 microsecond, the time between discharges on each disc is $$\frac{1}{480} = 2083 \text{ microseconds}$$

which is the time required for disc 22 to rotate 45 degrees and for the completion of one transmitter sweep. The time between successive discharges in adjacent transmitters is $$\frac{2083}{5} = 416.6 + \text{microseconds}$$

corresponding to the 9 degree displacement. In other words, if a discharge occurs at transmitter A when the time $t=0$, the discharges at transmitters B, C, D and E occur at 417, 833, 1249 and 1666 microseconds later, respectively. As will be explained below, each spark discharge preferably has a random variation of plus and minus 50, that is, 100 microseconds.

Assuming the craft 36 is on course and receiving the waves from the five transmitters, the waves collected by antenna 37, Fig. 4, are supplied to converter 43 and combined with waves from the beat oscillator 45. The resulting intermediate frequency waves are amplified in amplifier 46 and the detected pulses obtained in the output of detector 47 are amplified in the video amplifier 48. The amplified pulses are impressed over branch line 49 and through the isolation amplifier 51 on the horizontal plates 52 and 53 of indicator tube 54. The 480-cycle current in the output of video amplifier 48 is supplied to the 2-to-1 frequency divider 55 and the resulting 240-cycle current is utilized to control the sweep circuit 56 which applies a saw-tooth wave to the vertical plates 57, 58 of tube 54. The automatic gain control in the receiver is controlled by the signal of maximum intensity and functions to prevent overloading in the receiver. The reason for utilizing a cathode beam sweep frequency equal to one-half the frequency or rate of the transmitter sweep, will now be discussed.

Figure 5:
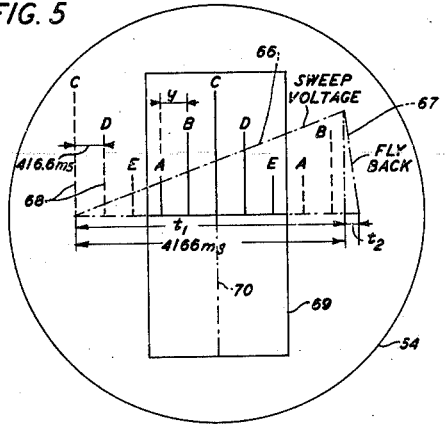
Fig. 5 is a diagram used in explaining the patterns obtained on the cathode-ray tube included in the receiving apparatus at the mobile craft.

Referring to Fig. 5, the slant line 66 represents the increase in sweep voltage during the time $t_1$ in which the beam moves to the right, and the slant line 67 represents the fly-back or rapid decrease in sweep voltage during the time $t_2$ in which the beam moves to the left, where $t_1+t_2$ equals twice the transmitting sweep period, that is, twice 2083 microseconds or 4166 microseconds. The sweep rate and the screen persistency are such that the pulses successively received from the five stations appear on the screen of the tube simultaneously and successive pulses from the same station are superimposed. If the frequency divider 55, Fig. 4, were omitted and a sweep control voltage of 480 cycles, corresponding to the transmitter sweep frequency, were utilized, the time required for each sweep on the tube, and hence the time interval between the beginning of one sweep and the initiation of the successive sweep, would be 2083 microseconds. while such an interval would by no means be too small to provide a proper fly-back time, $t_2$, and therefore to permit accurate synchronization of the beam sweep with the transmitting sweep, it appears advantageous to provide a more ample fly-back time. Accordingly, a slower sweep is utilized whereby as shown by the vertical lines 68, each of stations A, B, C, D and E is represented twice on the screen pattern and two sets of five spaced pulses may be obtained. The slower sweep frequency is obtained by adjusting frequency control knob on device 56 to secure a sweep voltage having a nominal frequency of 240 cycles, and utilizing the 240-cycle sweep control voltage to control or trigger this sweep voltage. By adjusting the phase control 60 of the sweep circuit 56 the trace representing station C may be centered on the screen; and by masking the left and right quarter portions of the pattern, as indicated by the box 69, Fig. 5, only one set of five pulses or traces corresponding to stations A, B, C, D and E and displayed in proper order, appears on the screen of tube 54. On the drawing, the five central full-line traces 68 represent the last mentioned set of five pulses and the five dash-line traces 68 represent the blanked-out set of five traces.

More particularly, while the spacing Y between adjacent traces 68 is directly related to the time interval between the emissions from adjacent stations, and is not a direct function of the physical spacing $n$ between the adjacent stations, the trace positions correspond to the transmitter positions relative to the runway because (1) the transmitters are spaced uniformly, as measured in a direction perpendicular to the runway, (2) the pulses from the transmitters are spaced uniformly on a time axis, (3) the traces 68 are, by reason of the linear beam sweep, spaced evenly on a line representing the distance M between the extreme stations A and E, and (4) the transmitting sweep and the cathode beam sweep are both left-to-right. Since the radiations from stations A, B, C, D and E are triangularly graded or tapered, and since the incoming pulses are impressed on the horizontal plates 52, 53 of tube 54, the heights of the vertical traces 68 are also triangularly graded. Hence, and solely by reason of the output intensity characteristics of the several transmitters, the traces or transmitter images 68 obtained on tube 54 may be easily identified with the respective transmitters and a pattern outlining a portion of the airport obtained. In addition, as will be explained, the trace identification is enhanced by reason of the directivities of the receiving and transmitting antennas.

Figure 6:
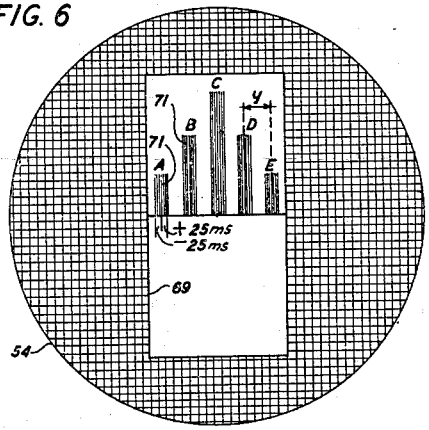
Figs. 6, 7, 8 and 9 illustrate typical patterns obtained on the tube indicator.

The vertical traces shown in Fig. 5 represent the on-course indications which would be obtained if the duration of sparking or discharge at the spark discharge gap were one microsecond. These traces each have a hair-line width of approximately 0.01 of an inch corresponding to the width of the cathode beam and may be difficult to observe. By reason of the actual random variation of 100 microseconds in the occurrence of the spark discharge, block traces 71 shown in Fig. 6 are obtained, each having a width corresponding to approximately 100 microseconds. With a 4 inch tube sweep corresponding to 4166 microseconds each block trace has an actual width of, approximately, $$\frac{(100)(4)}{4166} = 0.096 \text{ inch}$$

or approximately 0.1 inch, and each block is readily observed. Incidentally, if a 480-cycle sweep control voltage were used each block or square-top trace would have a width equal to twice that of block 71, that is, 0.2 inch. During each second of the cathode beam sweep 480 block traces corresponding to the transmitting pulse rate, are superimposed on each other to form each of the resultant block traces 71. Since the timing of the sweep may also vary slightly, the width of each block trace may vary slightly.

Referring to Figs. 1 and 6, and still assuming the craft 36 is on the course, the axis 21 of the receiving lobe 40 is aligned with the central wave direction 63 and intersects the lobe 40 at its point 72 of maximum intensity commonly called the "nose." Disregarding, for the moment, the fact that the directions of the waves from the various transmitters actually converge on the receiving antenna of the incoming craft, and bearing in mind that, in Fig. 1, the size of the receiving lobe 40 is greatly exaggerated as compared with the cross-section of the incoming beam, the wave directions 62 and 64 intersect lobe 40 at points 73 and 74, respectively, having lower and equal intensities, and the extreme wave directions 61 and 65 intersect lobe 40 at points 75 and 76, respectively, having still lower and equal intensities. Hence, even if the intensities of the distinct waves propagated along directions 61 to 65 were equal instead of graded, the heights of the traces 71 would be graded triangularly approximately, since the response of the receiving antenna 37 over the sector containing the five directions is peaked at the center, and is graded approximately triangularly. Accordingly, the difference in height between adjacent block traces 71 resulting from the tapered transmitter intensities, is accentuated by the receiving antenna directivity.

While the wave directions incoming to the receiving antenna are substantially parallel at a large distance from the airport transmitters, actually the left-side and right-side directions 61, 62, 64 and 65 converge slightly, as shown by the dotted lines 79, 80, 81 and 82, toward the pole of lobe 40 which represents the angular sensitivity of the receiving dipole 12. The result is that the spacings of the lobe intersection points 75, 73, 72, 74 and 76 are slightly decreased, as compared with the spacings shown on Fig. 1, but this decrease or compression is not sufficient to render the antenna response, for the five incoming directions, flat instead of triangular. When the wave directions are considered to be converging instead of parallel, advantage is taken of the fact that the transmitting lobes are shaped like the receiving lob. Thus, the converging directions 79, 80, 63, 81 and 82 extend from the five dipoles 12 of the transmitting antennas 6, 7, 8, 9 and 10 to the pole or dipole 12 of the receiving antenna 37. Consequently the direction of the waves emitted by the side antennas and received at the craft are not aligned with the axes 21 of the transmitting lobes 16, 17, 19 and 21 but are angularly related thereto. In other words, at stations B and D, the outgoing waves eventually received at the craft 36 intersect the transmitting lobes 17 and 19, respectively, at points of less than maximum intensity; and the outgoing waves from stations A and E intersect lobes 16 and 20, respectively, at points still lower down on the lobes. Accordingly, trace identification at the receiver is obtained by virtue of the directivities of the transmitting antennas as well as by reason of the graded transmitter intensities and the directivity of the receiving antenna. For the assumed on-course condition illustrated by lobe 40, Fig. 1, a tube pattern such as is illustrated by Fig. 6 is obtained.

Figure 7:
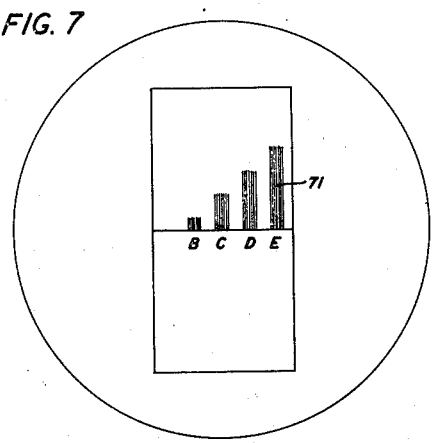

Referring to Figs. 1 and 7, and assuming now that the craft 36 is headed at a large angle to the right of the desired course so that the lobe 40 assumes the position denoted by reference numeral 77, Fig. 1, the waves from one or more of the left-side stations as, for example, station A, will not be received and the directions 62, 63, 64 and 65 will intersect lobe 77 at points 83, 84, 85 and 86 having sharply graded intensities and located at the left of the maximum lobe intensity point 72. Since point 86 is considerably higher, or closer to the maximum point 72 on lobe 77, than point 85, the height of the block trace 71 for station E, Fig. 7, will be greater than that of the block trace 71 for station D, although the intensity of the transmission is greater at station D. Also, the height of the trace 71 for station D may be equal to or greater than that of the trace 71 for station C. The height of the trace 71 for section B will be considerably less than the height of the trace 71 for station C, since the output intensity at station B is less than that of station C and the wave direction 62 for station B intersects lobe 77 at a point 83 far below the point 84 at which the wave direction 63 for station C intersects lobe 77.

Figure 8:
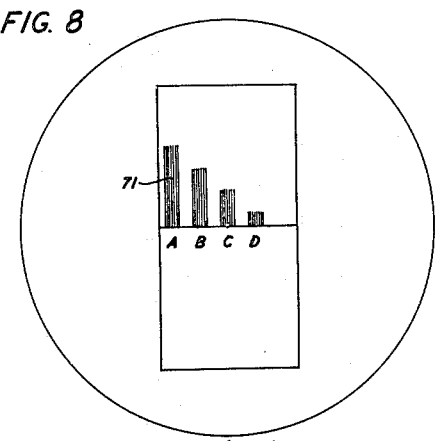

Similarly, referring to Figs. 1 and 8, if the craft is headed to the left so that the lobe assumes the position denoted by numeral 87, wave direction 65 avoids the lobe and directions 64, 63, 62 and 61 intersect the lobe at points 88, 89, 90 and 91 on the right side of the lobe; and the pattern shown in Fig. 8 is obtained. For smaller angles of heading deviations, left or right, patterns intermediate the on-course pattern, Fig. 6, and either off-course pattern, Fig. 7 or Fig. 8, are obtained. Accordingly, if the heading is incorrect the pilot may ascertain the amount and sense of the deviation. If the left or right heading is incorrect to an excessive degree so that no pulses are received from the transmitting stations, the cathode beam sweep frequency is nevertheless about 240 cycles, since the frequency control knob 59 is adjusted for this frequency, and a straight line is observed on the screen of the oscilloscope.

Figure 9:
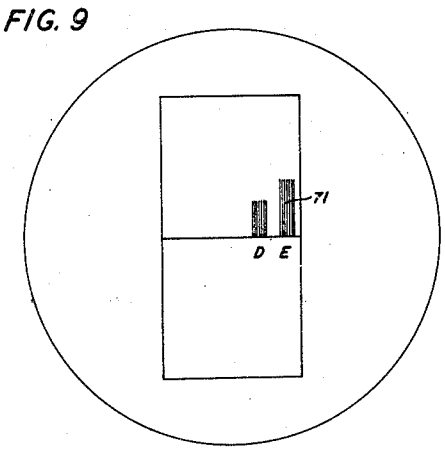

Referring to Figs. 1 and 9 and assuming the craft 36 has drifted to the right, although its heading is parallel to the runway, so that the lobe 40 assumes the position denoted by numeral 92, the incoming directions 61, 62 and 63 of the waves from the left-side stations A and B and the central station C will not intersect the lobe and their corresponding traces will be missing from the tube pattern, as illustrated by Fig. 9. Since directions 64 and 65 incoming from stations D and E intersect the lobe 92 at low and high intensity points 93 and 94, respectively, the height of the trace 71 for station D will be less than that of the trace for station E, although the wave emitted at station D has a greater intensity than the wave emitted at station E. If the drift is to the left a pattern similar to that shown in Fig. 9, but of opposite sense, is obtained. Accordingly, in the event of drift, the pattern gives an indication of the sense and amount of the drift.

As is apparent from the above, the pilot ordinarily navigates, in the horizontal plane, so as to secure and maintain the on-course pattern illustrated by Fig. 6. Assuming a pattern such as that shown in Fig. 6 is obtained, as the craft approaches the airport runway the extreme traces 71 representing stations A and E first disappear and later, if the landing approach is very long, the traces 71 representing stations B and D may disappear so that only the trace for station C remains. Since the mouth or span M of the transmitting array 13, Fig. 1, is relatively small, the pilot may roughly estimate his progress or depth into the array field, and hence estimate the distance to be traversed, by noting the change or reduction of the pattern. Thus at the moment when image stations A and E disappear he is at a predetermined distance from his destination and later, when the traces for stations B and D disappear, he is at a shorter known distance from his destination. If desired, a radio detecting and ranging system may be used at the main airport station C for receiving the pulses emitted by antenna 8 and reflected by the aircraft whereby the distance to craft 36 may be accurately determined and this information may be conveyed to the pilot over a separate ground-to-plane communication system.

If desired, the vertical plane traces of the lobes of the transmitting antennas at the airport may be utilized for assisting the pilot in effecting a blind landing. Thus the axes of the five transmitting antennas 6, 7, 8, 9 and 10 may be tilted at an acute angle relative to the horizontal. In landing, if the mobile craft tilts up or down too far the block traces 71 disappear. Hence, considering the vertical plane, the pilot may effect a satisfactory landing by heading the craft so as to maintain a constant on-course pattern.

In the system of Fig. 1, a corner array 13 is utilized in order to sharply outline the runway, but obviously other array configurations may be employed, the only requirement being that the span M of the array be relatively small. Thus the parabolic antennas may be arranged in a linear array 95, as shown in Fig. 10, or in a parabolic array 96 as shown in Fig. 11. Each of these arrays has the same span length M as the array 13 shown in Fig. 10. While only five antennas are illustrated in each of arrays 13, 95 and 96, obviously the arrays may each comprise any practical number of antenna units. Also, while the transmitting antennas are of the parabolic type, other types of directive antennas may be employed. As will now be explained, if desired, only two transmitting stations may be used at the airport and a substantially non-directive receiving antenna may be used at the mobile craft.

Referring to Fig. 12, the simplified embodiment comprises two transmitting stations F and G spaced apart a distance corresponding to the spacing between the extreme stations A and E of the array of Figs. 1, 10 or 11. The apparatus of each of stations F and G is the same as that at each of the transmitting stations in the system of Fig. 1. The fixed spark gap electrode 28 in the timer 4 at station G is displaced 22.5 degrees relative to the fixed electrode 28 at station F so that, as the discs 22 rotate, the transmitters are alternately energized. Numerals 97 and 98 denote the directive antennas at stations F and G, respectively. The receiving antenna at the craft 36 comprises an exciter or primary dipole 99 and a secondary or reflector dipole 100 positioned a quarter wavelength behind dipole 99. The two dipoles form an array having a cardioid directive characteristic 101 which is not sharply directive. In operation, with the craft on the course only the two extreme block traces 71 of equal heights, Fig. 6, are obtained. With the craft heading off course and to the right, the two block traces have unequal heights, the right trace being the higher and the heights of the two traces being comparable to the heights of the traces B and D in Fig. 7. With the craft heading to the left, the left trace has the greater height and the heights of the two traces are comparable to those of traces B and D, Fig. 8. If the craft drifts materially to the right only the right trace appears in the tube pattern, and if it drifts to the left only the left trace appears in the pattern.

As explained previously, in the system of Fig. 1 (or Figs. 10 or 11) and Fig. 4, an intermediate frequency amplifier having a relatively wide operating band of $100 \pm 10$ megacycles is required to accept the frequency variations in the waves emitted by the transmitters, all of which have the same normal operating frequency. The amplifier band width requirements may be lessened, and an intermediate frequency amplifier having a narrow band characteristic of say $100 \pm 2.5$ megacycles may be utilized, by upwardly or downwardly grading the nominal frequencies successively transmitted by stations A, B, C, D and E, and by simultaneously and correspondingly changing at the receiver the beat oscillator frequency.

Referring to Figs. 1 and 13, the transmitting stations A, B, C, D and E may be adjusted to emit, respectively, the graded frequencies F, $F+f$, $F+2f$, $F+3f$ and $F+4f$, where F is in the order of 3000 megacycles and $f$ is in the order of 3 megacycles. By careful design the variation at each transmitter may be limited to $\pm 2.5$ megacycles. The apparatus at the mobile craft includes antenna 37, line 33, receiver 102 and an indicator 39. The receiver 102 comprises a converter 43, a narrow band amplifier 103, a velocity-variation beat oscillator 104 for producing a frequency which cyclically varies from 100 to 115 megacycles, a detector 47, a video amplifier 48 having its output divided into the three branches 49, 50 and 105, an isolation amplifier 51 in branch 49, a 2-to-1 frequency divider 55 in branch 50, and a sweep control circuit 106, hereinafter denoted the "second" sweep circuit, for controlling the frequency of oscillator 104 in branch 105. As in the receiver of Fig. 4, the indicator 39 comprises a sweep circuit 56, hereinafter denoted the "first" sweep circuit, and a cathode-ray tube 54, the sweep control circuit 56 being included between the frequency divider 55 and the vertical plates 57, 58 of tube 54 and the isolation amplifier 51 being connected to the horizontal plates 52, 53 of tube 54.

The variable velocity-variation oscillator 104 comprises the vessel 107, an electron gun including a cathode 108, the anode 109, the tuned cavity 110, and a repeller or reflective electrode 111. The cavity is coupled by line 44 to the converter 43. Numeral 112 denotes a battery connected between the cathode 108 and anode 109 for impressing a positive potential on the anode and numeral 113 denotes a battery connected between the cathode and repeller 111 for impressing a negative potential on the repeller. As described thus far the velocity-variation oscillator is the same as that disclosed in Patent 2,406,850 granted on September 3, 1946, to J. R. Pierce. In accordance with the invention the sweep voltage in the output of the second sweep control device 106 varies in accordance with the graded transmitter frequencies, and this voltage is included in series with repeller battery 112, whereby the negative repeller voltage, and therefore the output frequency of cavity 110, is varied in accordance with the transmitter frequencies. More particularly, the positive output terminal of sweep control device 106 is connected to ground and the negative output terminal is connected to the positive terminal of repeller battery 112, whose negative terminal is connected to the repeller 111.

Referring to Figs. 13 and 14, the second sweep circuit 106 is controlled or triggered by a 480-cycle voltage obtained in the output of video amplifier 48. Accordingly, a sweep voltage represented by the line or linear curve 114, Fig. 14, is synchronized with the transmitter sweep. Note that the period for one sweep of the second sweep voltage is 2083 microseconds, Fig. 14, whereas the period for one sweep of the first sweep voltage applied to the tube is 4166 microseconds as shown in Fig. 5. The curve 114 also represents the change in the negative repeller voltage and the corresponding change in the beat oscillator frequency during one transmitter sweep. Thus, assuming that the repeller voltage is $-E$ and the beat oscillator frequency is L as, for example, 2900 megacycles, when the frequency F is received from station A, the successive values of the repeller voltage are $-V+v$, $-V+2v$, $-V+3v$, and $-V+4v$, and of the beat frequency are $L+f$, $L+2f$, $L+3f$ and $L+4f$ when frequencies $F+f$, $F+2f$, $F+3f$ and $F+4f$ are successively received from stations B, C, D and E, respectively, whereby a constant intermediate frequency $F-L = 3000-2900 = 100$ megacycles is obtained. While the beat oscillator frequency increases during the 100 microsecond period corresponding to each pulse duration, as indicated by the spaced heavy short sections 115 of curve 114, the increase has negligible effect on the character of the block trace, since most of the spark discharges occur in $\pm 25$ microseconds and only a few are as far apart as $\pm 50$ microseconds.

Although the invention has been explained in connection with certain embodiments it should be understood that it is not limited to these embodiments since other apparatus may be successfully employed in practicing the invention. While centimetric waves are preferably employed other waves such as millimetric waves, decimetric waves and ultra-short waves may be utilized.

What is claimed is:

1. In an airport landing system, an odd plurality of pulse transmitting stations each comprising a transmitter connected to a unidirective antenna having a maximum lobe, said antennas being spaced along a linear or curvilinear line intersecting a runway, the principal lobe axis of the central antenna being aligned with said runway and the axes of all antenna lobes being substantially parallel, means for successively and cyclically actuating said transmitters, means connected to said transmitters for grading the transmitter output intensities relative to each other and laterally of said runway, means at a mobile craft for receiving the emitted pulses, said means comprising a unidirective antenna having a major lobe aligned with the longitudinal axis of the craft, a cathode-ray tube indicator having horizontal plates and vertical plates, a sweep circuit connected to said vertical plates, means for obtaining from the received pulses and supplying to said sweep circuit a control voltage having a frequency dependent upon the cyclic actuation of said transmitters, and means for applying the received pulses to said horizontal plates.

2. A system in accordance with claim 1, said control voltage having a frequency equal to one-half the frequency of the transmitter sweep or cyclic transmitter actuation.

3. In a navigational system, means at a given location for successively and directively transmitting radio waves of graded frequencies, means at a mobile craft for receiving each of said graded frequencies, said means comprising a directive antenna, a velocity-variation oscillator comprising a repeller electrode for obtaining a beat frequency, a converter connected to said antenna and said oscillator for combining said received frequencies with said beat frequency to obtain successively different intermediate frequencies, a sweep control means connected to said converter for obtaining a voltage cyclically changing directly in accordance with the changes in said received frequencies, and means for applying said voltage to said repeller electrode, whereby the beat oscillator frequency varies in accordance with said change in voltage and said intermediate frequencies have the same frequency value, substantially.

4. In a blind navigational system, a plurality of beam transmitters spaced laterally across a desired homing course, the beam axes of said transmitters being aligned substantially parallel with said course, the intensities of said transmitters being graded laterally of said course, whereby lateral deviations of a homing mobile craft from said course are distinguishable, each of said transmitters having a distinguishing radiation characteristic, and receiving and indicating means on a homing mobile craft for receiving said beam and indicating said lateral deviations, said means including a directionally responsive antenna whose axis is aligned with the axis of the craft for furnishing indications of heading deviations, and means responsive to said radiation characteristic, for identifying a particular one of said transmitters toward which said craft is instantaneously heading.

5. In a blind navigational system, a plurality of beam transmitters spaced laterally across a desired homing course, means for cyclically actuating said transmitters to emit radiation pulses in succession, beam-receiving and pulse-indicating means on a homing mobile craft, said pulse-indicating means comprising a cathode beam tube having a slow-decaying luminescent beam responsive screen, means for sweeping the beam of said tube in a path across said screen in synchronism with said cyclic transmitter actuation, and means for deflecting said beam from said path on reception of each pulse from each of said transmitters, whereby the position of each beam deflection is indicative of the heading of the craft relative to the corresponding one of said transmitters, said cyclic transmitter actuating means including an element characterized by a short, random time variation, whereby successive deflections of said receiver beam due to each transmitter occur slightly separated on said screen and are merged by the slow decay characteristic of said screen into a single more pronounced indication.

REYMOND J. KIRCHER.

REFERENCES CITED

The following references are of record in the file of this patent:

UNITED STATES PATENTS

| Number | Name | Date |
| --- | --- | --- |
| 2,034,520 | Lieb | Mar. 17, 1936 |
| 2,039,812 | Lieb et al. | May 5, 1936 |
| 2,151,549 | Becker | Mar. 21, 1939 |
| 2,216,707 | George | Oct. 1, 1940 |
| 2,226,860 | Greig | Dec. 31, 1940 |
| 2,250,511 | Varian et al. | July 29, 1941 |
| 2,273,914 | Wallace | Feb. 24, 1942 |
| 2,279,151 | Wallace | Apr. 7, 1942 |
| 2,279,246 | Podliasky et al. | Apr. 7, 1942 |
| 2,280,824 | Hansen et al. | Apr. 28, 1942 |
| 2,312,203 | Wallace | Feb. 23, 1943 |
| 2,361,956 | Moseley | Nov. 7, 1944 |

FOREIGN PATENTS

| Number | Country | Date |
| --- | --- | --- |
| 768,440 | France | Aug. 6, 1934 |